73-641 SR

3/6/84 OR 4,434,662

United States Patent [19]

Green

[11] 4,434,662

[45] Mar. 6, 1984

[54] ULTRASONIC IMAGE GENERATING APPARATUS

[75] Inventor: Philip S. Green, Atherton, Calif.

[73] Assignee: Siemens Corporation, Iselin, N.J.

[21] Appl. No.: 274,282

[22] Filed: Jun. 16, 1981

[51] Int. Cl.³ .............................................. G01N 29/04

[52] U.S. Cl. .......................................... 73/641; 73/642

[58] Field of Search .................. 73/641, 618, 607, 596, 73/642; 128/660; 367/150

[56] References Cited

U.S. PATENT DOCUMENTS

| | | | |
|---|---|---|---|
| 3,859,984 | 1/1975 | Langley | 73/641 |
| 3,937,066 | 2/1976 | Green et al. | 73/67.5 R |
| 3,971,962 | 7/1976 | Green | 310/8.1 |
| 4,016,751 | 4/1977 | Kossoff | 73/641 |

OTHER PUBLICATIONS

Philip S. Green et al., "A New, High-Performance Ultrasonic Camera" (1974) *Acoustical Holography", vol. 5, P. S. Green, Editor, pp. 493–503.*

J. R. Suarez et al., "Biomedical Imaging with the SRI Ultrasonic Camera" *Acoustical Holography,* vol. 6, P. S. Green, Editor, pp. 1–13.

*Primary Examiner*—Anthony V. Ciarlante
*Attorney, Agent, or Firm*—Karl F. Milde, Jr.

[57] ABSTRACT

The ultrasound apparatus contains a focusing device such as a lens or lens system for focusing ultrasound waves. It also contains an ultrasound detector for receiving the focused ultrasound waves. The detector includes a number of elongated piezoelectric detector elements. The longitudinal axis of these elongated elements are curved. The focusing device is an astigmatic focusing device and has a first and a second focal plane. The ultrasound detector is positioned in one of these planes.

8 Claims, 13 Drawing Figures

ULTRASONIC IMAGE GENERATING APPARATUS

BACKGROUND OF THE INVENTION

1. Field of the Invention

This invention relates generally to an apparatus for generating an image according to an ultrasonic wave.

2. Description of the Prior Art

Ultrasonic systems of the type herein contemplated are disclosed, for instance, in U.S. Pat. No. 3,967,066, in *Acoustical Holography,* vol. 5, pages 493–503, 1974, and in *Acoustical Holography,* vol. 6, pages 1–13.

In the U.S. Pat. No. 3,971,962 a linear transducer array for ultrasonic image conversion in an ultrasonic orthographic imaging system is disclosed. The prior art transducer array contains a large number of elongated transducer elements. In the prior art reference is mentioned that from the standpoint of resolution, it would be favorable to design each element of the sampling array to be small and to have equal height and width. In other words, each element should have either a square or circular shape, and it should be small in both dimensions. However, there are some problems associated with a small element: the electrical impedance of such an element is very high. This would lead to impedance matching problems in the electric circuits which detect and process the signals derived from the individual elements. This is true, for instance, for the preamplifiers which are connected to each respective element. Poor impedance matching would result in a low signal-to-noise ratio.

In order to avoid these problems, in the prior art design very long receiver elements are chosen, as mentioned above. Each of the elongated elements corresponds or is equivalent to many small elements which are connected in parallel. A parallel connection of elements has comparatively low impedance. Thus, the impedance matching problem has been solved. However, simultaneously the resolving power of the array of elements has been reduced in one dimension, that is the dimension of the longitudinal axis of the element. In order to correct this reduction of resolution, the prior art patent suggests applying a cylinder lens which is arranged a short distance in front of the array of elongated elements. The cylinder lens is situated in a position to cause the converging wavefronts from an image-forming lens to collimate in one dimension.

It has turned out that such a cylinder lens may produce undesirable internal reverberations of the ultrasonic waves between the front and back surface of the cylinder lens. Therefore, spurious acoustic waves may be superimposed in the image field received by the elements. The superposition of these waves results in additional patterns superimposed in the true ultrasonic image which is to be displayed. It is highly desirable to avoid the superposition of such patterns.

Application of a cylinder lens may also have another effect. There may also occur reflections between the elongated transducer elements and the cylinder lens. The surface of the elements has an impedance which is somewhat different from the impedance of the fluid which is conventionally interposed between the elongated elements and the cylinder lens. Thus, there may occur reflections on the surface of the elements and reflections on the surface of the cylinder lens. Again, this effect will result in undesired patterns in the ultrasonic image.

The cylinder lens itself constitutes an additional complex component, which requires some expenditures. For proper operation, the cylinder lens should be covered by a matching layer. Applying this layer requires some work and is time consuming. Therefore, it is desirable to use elongated low-impedance transducer elements, but to eliminate the otherwise concomitant requirement or necessity of a cylinder lens.

SUMMARY OF THE INVENTION

1. Objects

It is an object of this invention to provide an ultrasonic apparatus in which elongated low-impedance elements are used, and in which nevertheless a cylinder lens is avoided.

It is another object of this invention to provide an ultrasonic image generating apparatus in which superimposed patterns due to internal reverberations are avoided.

It is still another object of this invention to provide an ultrasonic orthographic imaging apparatus having elongated transducer elements, in which the converging wavefronts from an image-forming lens are caused to collimate in one dimension without the requirement of an additional cylinder lens.

2. Summary

According to the invention, an ultrasound apparatus is provided which contains a focusing device for focusing ultrasound waves, and an ultrasound detector for receiving the focused ultrasound waves. Before detection the ultrasound waves have been transmitted through an object, in particular through a patient. The detector contains a certain number of elongated piezoelectric detector elements, a so-called sensor array. The individual elements of the sensor array are curved, and the focusing device which focuses the ultrasound waves on the sensor array is intentionally provided with an astigmatism. Thus, the focusing device has two focal planes, and the sensor array is positioned in one of these focal planes.

The term "focusing device" in this connection is meant to be very broad. It comprises an imaging lens as well as an imaging lens system, and it also comprises an imaging mirror as well as a system of imaging mirrors. Preferably, a lens or lens system is applied.

The lens or lens system which is designed to have an astigmatism, is preferably made of plastic. Principally, it may be made of any solid material which has the required index of refraction. Also combinations of solid materials and liquids are applicable.

The term "focusing device" should also include the possibility of interposing between focusing lens(es) or mirror(s) a prism combination or any other means for scanning the ultrasound waves along the detector array. Such scanning prism combination is well-known in the art.

It should be pointed out that the sensor array which usually will have a multitude of elongated elements, may either be positioned at the first focal plane or at the second focal plane. It is assumed that the second focal length is larger than the first focal length. There is a slight preference for positioning the sensor array in the first focal plane. The reason for this is that one can obtain a good contact between the sensor array and a membrane which, according to the state of of the art, may be used to seal the sensor array from a water tank.

Into this tank a patient may be introduced for examination. For some applications it may also be easier to construct a convex array of elements (convex as seen from the ultrasound source) as opposed to a concave array.

The elongated elements the longitudinal axes of which have the above-mentioned curvature, may preferably be made out of a piezoelectric ceramic. It has turned out that it is possible to form slim curved piezoelectric ceramic rods. In the production process, the material for the elongated elements preferably will be cast or ground into shape in order to assume the desired curvature.

Impedance matching coating may be put on the individual elements.

There may be means provided to hold the elements parallel or approximately parallel to each other. These means may include two comb structures for supporting the opposite ends of the elements.

The array of elements may be linear. Preferably, however, the elements are arranged with a certain curvature. This curvature is provided for making the detector array coincident with the plane of best focus.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
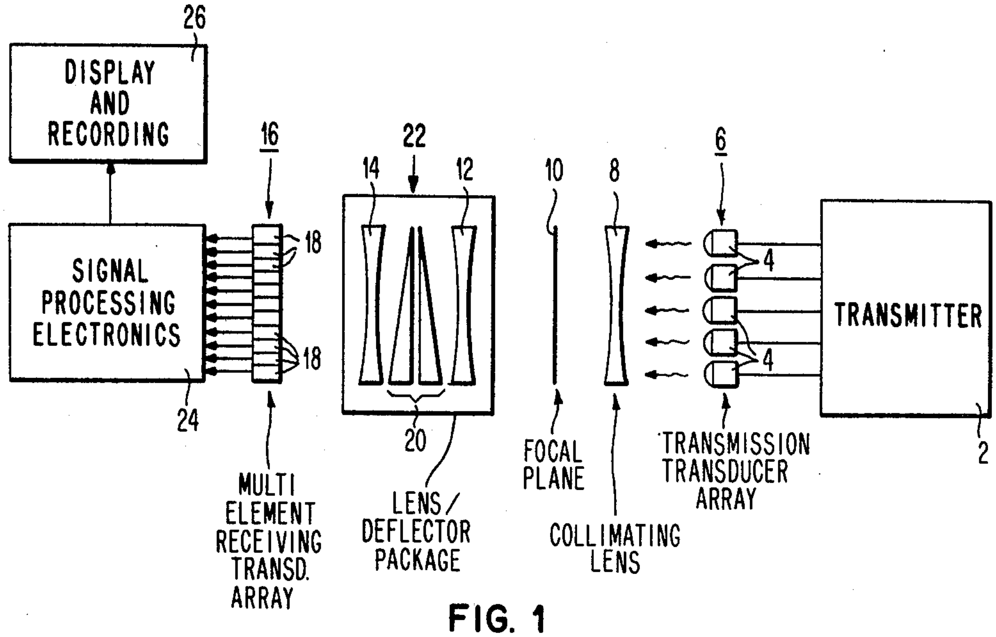
FIG. 1 is a block diagram of an ultrasound examination apparatus.

Referring to FIG. 1, a block diagram of an ultrasonic camera system or ultrasonic orthographic imaging system is illustrated. In this system the transducer array and the focusing device according to the invention may be employed.

According to FIG. 1, a variable-power rf amplifier or transmitter 2 transmits a pulse of electrical energy to a selected one of a number of ultrasound transducers 4 arranged in a transmission transducer array 6. The transducer array 6 converts the electrical signals to a pressure wave that propagates through a collimating lens 8 toward an object (not shown) under examination. The object, for instance a patient, is placed in the focal plane 10 of the system. To a certain degree, the pressure wave is scattered by the object.

Two plastic lenses 12 and 14 collect and focus the scattered waves toward a multi-element receiving transducer array 16 to form an ultrasonic image. This image is detected by the line array 16 containing a large number of small receiving transducers or elements 18.

The receiving transducer array 16 detects only one picture of the image. A complete picture is obtained by repeatedly sweeping or deflecting the focused ultrasonic image past the line array 16 of receiving transducers 18. This is accomplished by a scanning device 20, which is represented by two counter-rotating ultrasonic prisms located between the two focusing lenses 12 and 14. The prisms rotate about the main radiation axis. The lenses 12, 14 and the scanning device 20 form a lens-deflector package 22.

The transducer array 16 is part of a receiving unit or acoustic camera which receives and focuses the compressional wave field from the insonified subject 10 and translates the wave field into electrical signals. For this purpose a signal processing electronic device 24 is provided. The electrical signals are converted into a real time visual display of the insonified object 10. The received data may be recorded by means of a display and recording device 26.

Details with respect to the ultrasonic system described so far may be found in U.S. Pat. No. 3,937,066. The teachings of this U.S. patent may be employed in the acoustic camera system of this invention. The teachings found in this U.S. patent are employed herein for the same purposes, and the subject matter of this prior art reference is specifically incorporated herein by reference.

Figure 2:
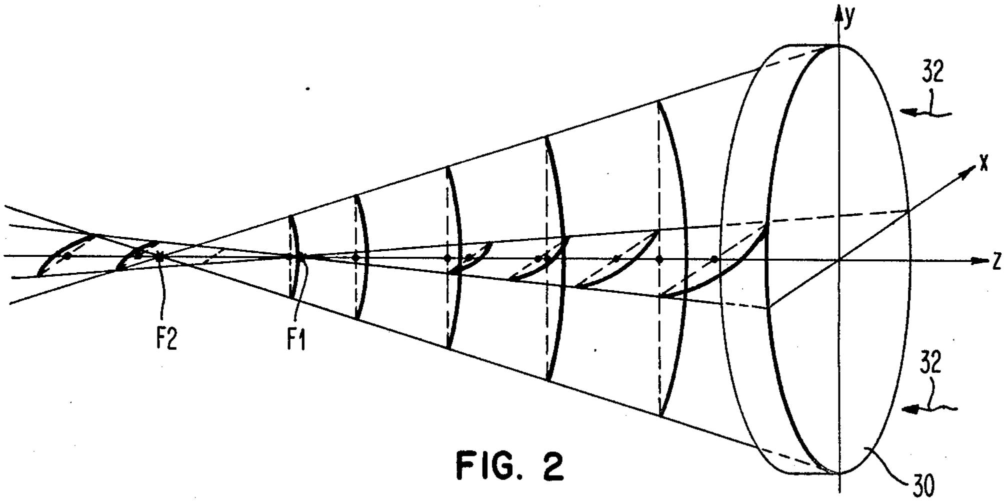
FIG. 2 is a perspective view of an astigmatic lens used as the image focusing device in FIG. 1.

In FIG. 2, an astigmatic image forming lens 30 is illustrated. This lens 30 represents the focusing lenses 12 and 14 of FIG. 1. In order to demonstrate later the position and curvature of the elongated elements 18, orthogonal coordinate axes x, y, z are introduced. The astigmatic lens 30 has two focal points F1 and F2 and two focal planes. Both focal points F1 and F2 are spaced from each other along the z-axis. It is assumed that ultrasound waves 32 impinge into the lens 30 from the right side, that is the waves 32 travel in (−z)-direction, and that the horizontal wave fronts (plane xz) are focused in the first focal point F1, whereas the vertical wave fronts (plane yz) are focused in the second focal point F2. The first focal point F1 is located in this embodiment closer to the lens 30 than the second focal point F2.

Focal points F1 and F2 are defined by the focal lengths of the lens and the conjugate focal plane located in the object to be imaged, according to well-known principles of optical design.

Figure 3:
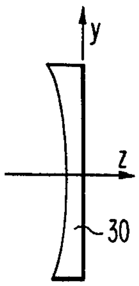
FIG. 3 is a cross section of the astigmatic lens of FIG. 2.
Figure 4:
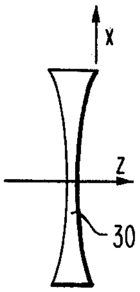
FIG. 4 is a cross section of the astigmatic lens of FIG. 2, taken perpendicularly to the cross section of FIG. 3.

In FIGS. 3 and 4 is illustrated that this can be achieved if the lens 30 has a form in the yz-plane which is different from the form in the xz-plane respectively.

In this example, in the yz-plane, the lens 30 is plane-concave, whereas in the xz-plane, the lens 30 is bi-concave. FIG. 3 shows a sectional view in the x-direction, whereas FIG. 4 shows a sectional view in the (−y)-direction. Important is that the lens z-thickness if one proceeds along the x-axis is different from the lens z-thickness if one proceeds along the y-axis. The astigmatic lens 30 may consist of one piece. Yet, it may also be a combination of two or more lenses.

Instead of a lens 30 or a lens system, also a mirror or mirror system could be used. Such a mirror or mirror system would also intentionally be provided with an astigmatism.

Generally speaking, an astigmatic lens or mirror will be obtained if the total curvatures in one direction, for instance in x-direction, is different from the total curvatures in the perpendicular direction, for instance in y-direction.

Figure 5:
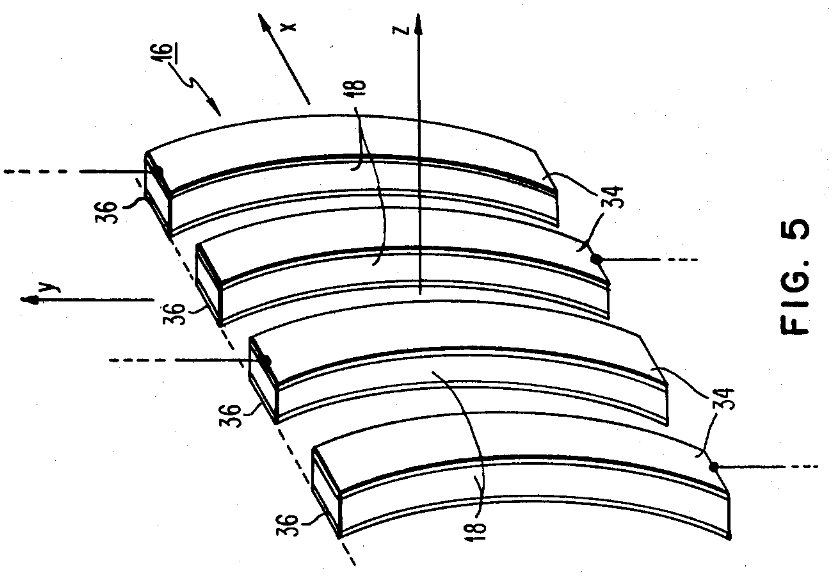
FIG. 5 is a perspective view of an array of curved elongated detector elements which may be placed in the first focal plane of the astigmatic lens shown in FIG. 2.

In FIG. 5 there is illustrated a multitude of elongated piezoelectric detector elements 18 forming a detector array 16. These elements 18 are arranged parallel to each other. They may be placed in the first focal plane including the first focal point F1. In order to match the wave front in the first focal plane the longitudinal axes of all detector elements 18 are curved. Thus, an array or arrangement results, which is convex, as seen from the ultrasound source. In order to depict easily the position of the detector array 16, with respect to the components shown in FIG. 2, again the coordinate system x, y, z is introduced. The main radiation direction is again in (−z)-direction. The longitudinal axes of the elements 18 are curved or bent with respect to the x-axis.

It should be pointed out that the cross-section of the individual elements 18 may be rectangular, in particular square. However, other shapes also may be chosen. The distance from one elongated element to the next may also widely be chosen. This distance is basically not related to the shape of the cross section of the individual elements.

It should also be mentioned that electric electrodes 34 and 36 are connected or attached to the individual elements 18. These electrodes 34 and 36 may be thin metallic layers provided of the front side and back side of the elements 18. The electrodes 36 on the back side may be electrically connected to each other, and the electrodes 34 on the front side may be connected to individual leads, or the opposite pattern may be used. Every other lead is directed in the upward (x-y)-direction, and the leads in between are directed downward, as illustrated in FIG. 5. Alternatively, all leads may be directed to the same side. It should also be mentioned that scanning of the image is performed in the y-direction.

Figure 6:
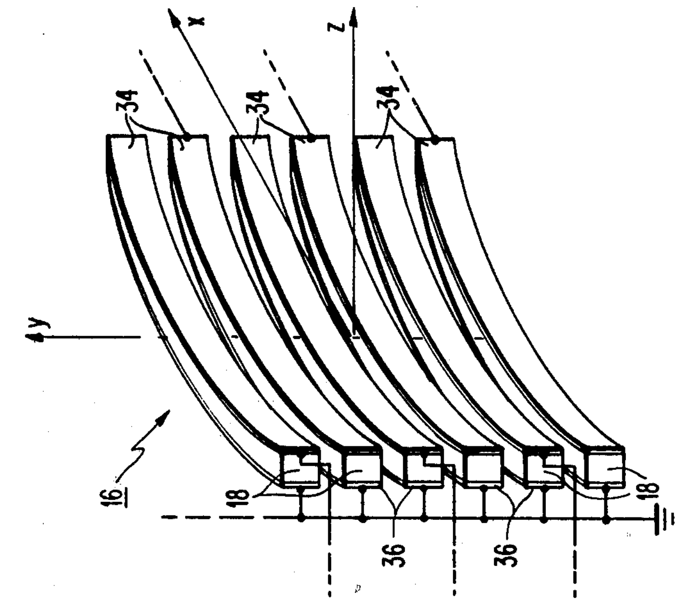
FIG. 6 is a perspective view of curved elongated detector elements which may be placed in the second focal plane of the astigmatic lens shown in FIG. 2.

In FIG. 6 a detector arrangement or array 16 is illustrated which may be positioned in the second focal plane including the second focal point F2. This detector array 16 also comprises a multitude of curved elongated elements 18. The elements 18 are here bent or curved about the y-axis. In other words: The curved longitudinal axes each are located in planes parallel to the x-z-plane. Again the curvatures serve to make the array 16 at least approximately coincident with the plane of best focus. Again, the electrodes 34, 36 of each individual element 18 are shown. They go all the way through on the front surface and on the back surface. It will be noted that this array 16 is a concave arrangement, as seen from the ultrasound source, and the elements are also concave. This is in contrast to the array 16 shown in FIG. 5. The curvature of the individual elements 18 is in accordance with the curvature of the ultrasonic wavefront which shall be received.

It shall also be mentioned that scanning of an image in this design is performed in the x-direction.

In FIGS. 5 and 6 the radius of curvature of the elongated detector elements 18 is set equal to the radius of curvature of a wavefront arising from the focusing device 30 as a result of a wavefront generated at the object plane 10 of the focusing device 30.

Figure 8:
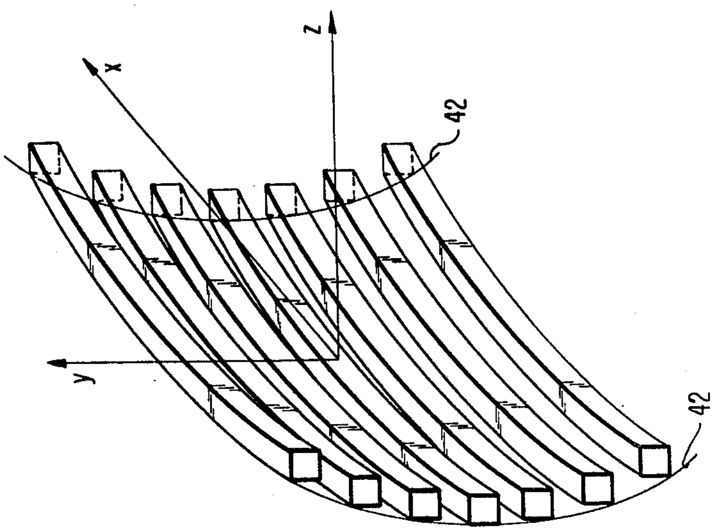
FIG. 8 is a perspective view of curved elongated detector elements corresponding to the array shown in FIG. 6, which elements are arranged along a curve.
Figure 7:
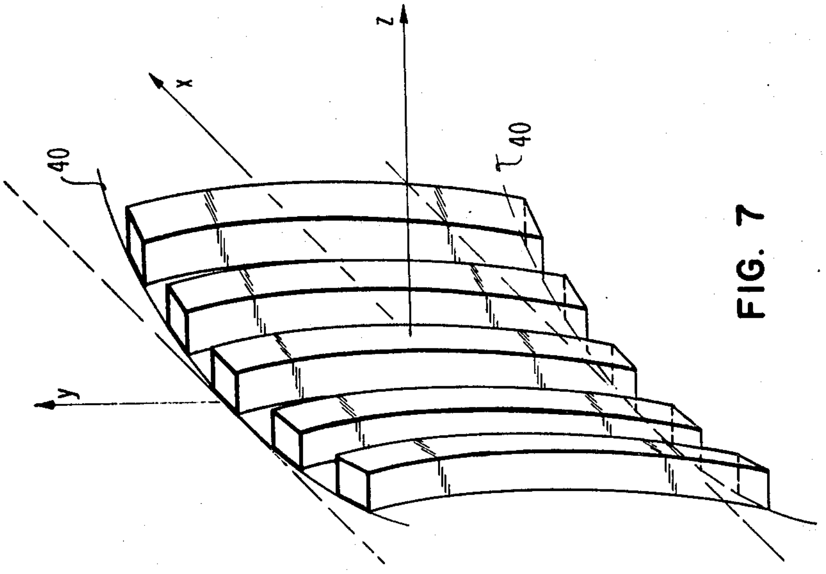
FIG. 7 is a perspective view of curved elongated detector elements corresponding to the array in FIG. 5, which elements are placed along a curve.

In FIGS. 7 and 8 is illustrated that the detector arrays 16 of FIGS. 5 and 6, respectively can be arranged along curves 40 and 42, respectively, to match best the incoming ultrasonic waves.

In FIGS. 9–13, details of a multi-element receiver transducer array according to the invention are illustrated.

Figure 9:
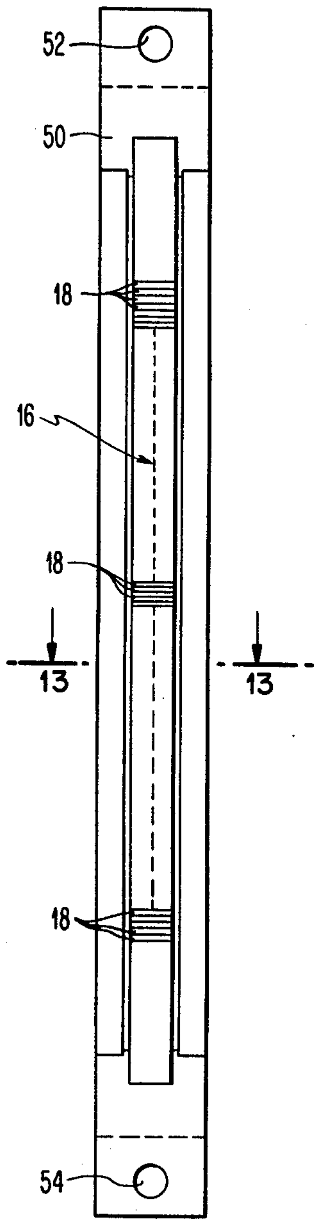
FIG. 9 is an enlarged front view of a multi-element receiving transducer array, including a supporting structure for the individual elements.
Figure 10:
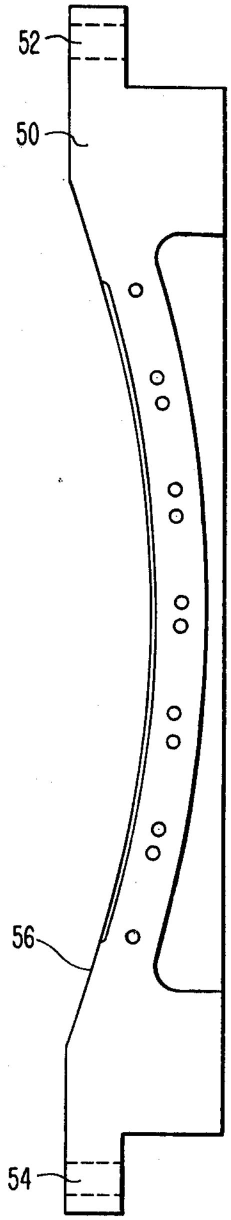
FIG. 10 is an enlarged side view of the transducer array of FIG. 9.

With reference to FIGS. 9 and 10, the transducer array 16 is supported by a supporting structure 50 which may be made out of a sturdy material such as aluminum. Two holes 52 and 54 are provided on opposite ends for attaching the supporting structure 50 to a camera box (not shown). In its middle section the supporting structure 50 contains a multitude of individual elongated elements 18. For instance, 192 elements 18 may be used in the illustrated transducer array 16. In FIG. 10 can be seen that the elements 18 are arranged along a curvature 56 on the front portion of the structure 50. The curvature 56 is provided in order to make the array 16 coincident with the plane of best focus. Curvatures 40 and 42, provided for the same purpose, have already been mentioned in connection with FIGS. 7 and 8, respectively. In FIG. 10 the curved longitudinal axes of the individual elements 18 are positioned roughly perpendicularly to the plane of the drawing. The individual elements 18 of the curved array 16 can clearly be seen in FIG. 9.

Figure 11:
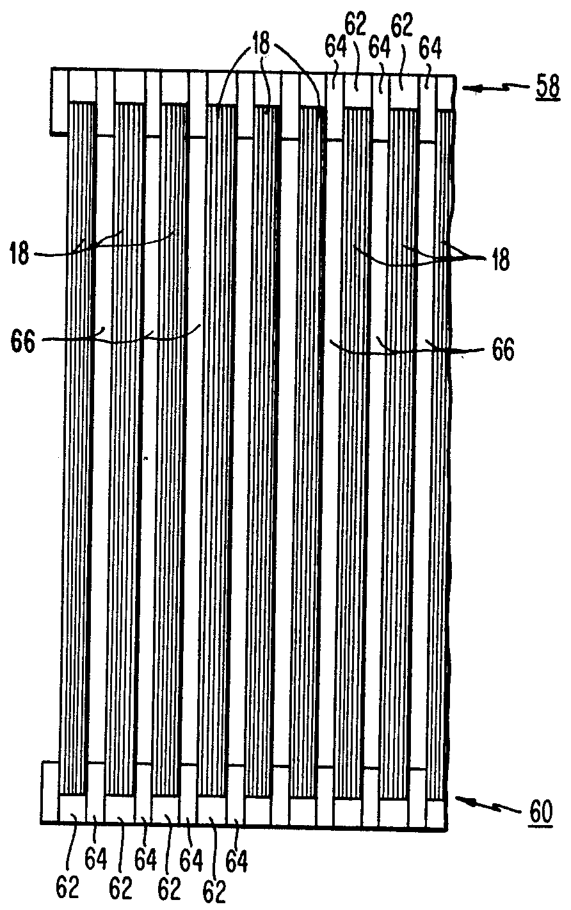
FIG. 11 is a magnified partial front view of the transducer array shown in FIG. 9.

According to the magnified partial front view of FIG. 11, the individual bars or elongated elements 18 are held in place by two side structures 58 and 60 which are parallel to each other. Each of these side structures contains first and second spacers 62 and 64, respectively. The first spacers 62 serve to hold the elements 18 in their position longitudinally, whereas the second spacers 64 provide gaps 66 of a predetermined width between the elements 18. Thus the elements 18 would be parallel to each other, if the curvature 56 would be disregarded. Both side structures 58 and 60 may be made out of aluminum.

Figure 12:
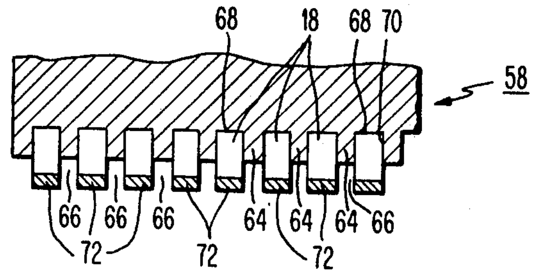
FIG. 12 is an enlarged partial cross sectional side view of the array shown in FIG. 9, illustrating a comb structure.

In the magnified partial side view of FIG. 12 is shown that the side structures 58 and 60 have a comb-configuration. The elements 18 are held in niches 68 each of which is formed by two second spacers 64 and one first spacer 62. The elements 18 are fixed in these niches 68 by a suitable cement 70. In FIG. 12 may also be seen that the outer survace or front side of the elements 18 is provided with an impedance matching coating or layer 72. Yet, these layers 72 are not absolutely necessary.

Figure 13:
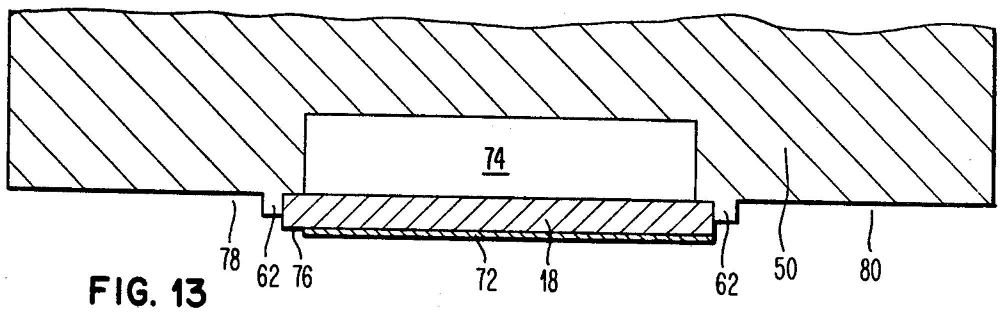
FIG. 13 is an enlarged cross sectional view of the array shown in FIG. 9 taken along the line X—X.

FIG. 13 is an enlarged cross-section along the line x—x in FIG. 9. In FIG. 13 is illustrated that the inner surface or backside of the individual elements is free from any layer 72 and does not engage any part. This is achieved by an open space 74 which may be filled with air. In FIG. 13 is again shown that the elements 18 may be coated with an impedance matching layer 72. The left side 76 of the element 18 is left free for connecting a connection lead to the front electrode. In FIG. 13 is also shown that close to the electrode and to the connection lead there may be provided a space 78 for housing a suitable circuit board (not shown). This circuit board may contain circuits of the signal processing electronic system. A similar space 80 may be provided on the right side of the structure 50 for those elements 18 whose electrodes and connection leads extend to the right side.

The embodiments shown in FIGS. 1–13 may be summarized as follows: As in the prior art a reduction in receiver-array element impedance is achieved by using elements 18 in the shape of long bars rather than small squares of the desired resolution size. To prevent the image resolution from being degraded by signal integration over the length of the bar, an array of curved elements 18 is used. The radius of curvature is set equal to the radius of curvature of the wavefront arriving from the lens 30 as a result of a wavefront generated at the object plane of the lens 30. The image forming lens 30 is made astigmatic, so that it focuses such a wavefront exactly on the array 16 in one plane, while focusing behind the array 16 in the orthogonal plane, so as to cause the wavefront in the second plane to impinge on the array element in coincidence.

The invention covers multi-element imaging lenses as well, wherein the astigmatic component may be confined to one element or distributed among several elements. The invention is useful in imaging systems employing a single, linear transducer array in which the focused wavefield is swept past the array by a moving deflection apparatus 20, or in which the transducer array 16 is moved in the image plane.

While the forms of an ultrasonic image generating apparatus herein described constitute preferred embodiments of the invention, it is to be understood that the invention is not limited to these precise forms of assembly, and that a variety of changes may be made therein without departing from the scope of the invention.

What is claimed is:

1. In an ultrasound apparatus comprising focusing means for focusing ultrasound waves and an ultrasound detector for receiving said focused ultrasound waves, said detector having a plurality of elongated piezoelectric electric detector elements, the improvement (a) wherein said focusing means are astigmatic focusing means having a first and a second focal plane, (b) wherein the longitudinal axes of said elongated detector elements are curved, and (c) wherein said ultrasound detector is positioned in one of said focal planes.

2. The improvement according to claim 1, wherein the radius of curvature of said elongated detector elements is set equal to the radius of curvature of a wavefront arriving from said focusing means as a result of a wavefront generated at an object plane of said focusing means.

3. The improvement according to claim 1, wherein said focusing means is an astigmatic lens.

4. The improvement according to claim 3, wherein said lens is a plastic lens.

5. The improvement according to claim 1, wherein said elements are arranged in a single transducer array, and wherein a deflection apparatus for sweeping a wavefield past said transducer array is provided, said wavefield being focused by said focusing means.

6. The improvement according to claim 1, wherein each of said elongated detector elements for detecting ultrasound includes:

(a) a rod containing a piezoelectric material and having a first and a second surface, said first and second surfaces being arranged opposite to each other, (b) a first and a second electrode attached to a respective one of said first and second surfaces for deriving an electric signal therefrom, and wherein said longitudinal axis is curved in a plane which intersects said first and second surface.

7. The detector element according to claim 6, wherein said first and second surfaces are arranged parallel to each other.

8. The detector element according to claim 1, wherein said elements are supported by two comb structures arranged at opposite ends of said elements.

* * * * *

UNITED STATES PATENT AND TRADEMARK OFFICE

CERTIFICATE OF CORRECTION

PATENT NO. : 4,434,662

DATED : March 6, 1984

INVENTOR(S) : Philip S. Green

It is certified that error appears in the above—identified patent and that said Letters Patent is hereby corrected as shown below:

On the cover page, at item [73], please change "Corporation, Iselin, N.J." to --Aktiengesellschaft, Federal Republic of Germany--.

In column 1, at line 12, please change "3,967,066" to --3,937,066--.

In column 3, at line 63, please change "X-X" to --13-13--.

Signed and Sealed this

*Second* Day of *October 1984*

[SEAL]

*Attest:*

GERALD J. MOSSINGHOFF

*Attesting Officer* *Commissioner of Patents and Trademarks*